UNITED STATES PATENT OFFICE.

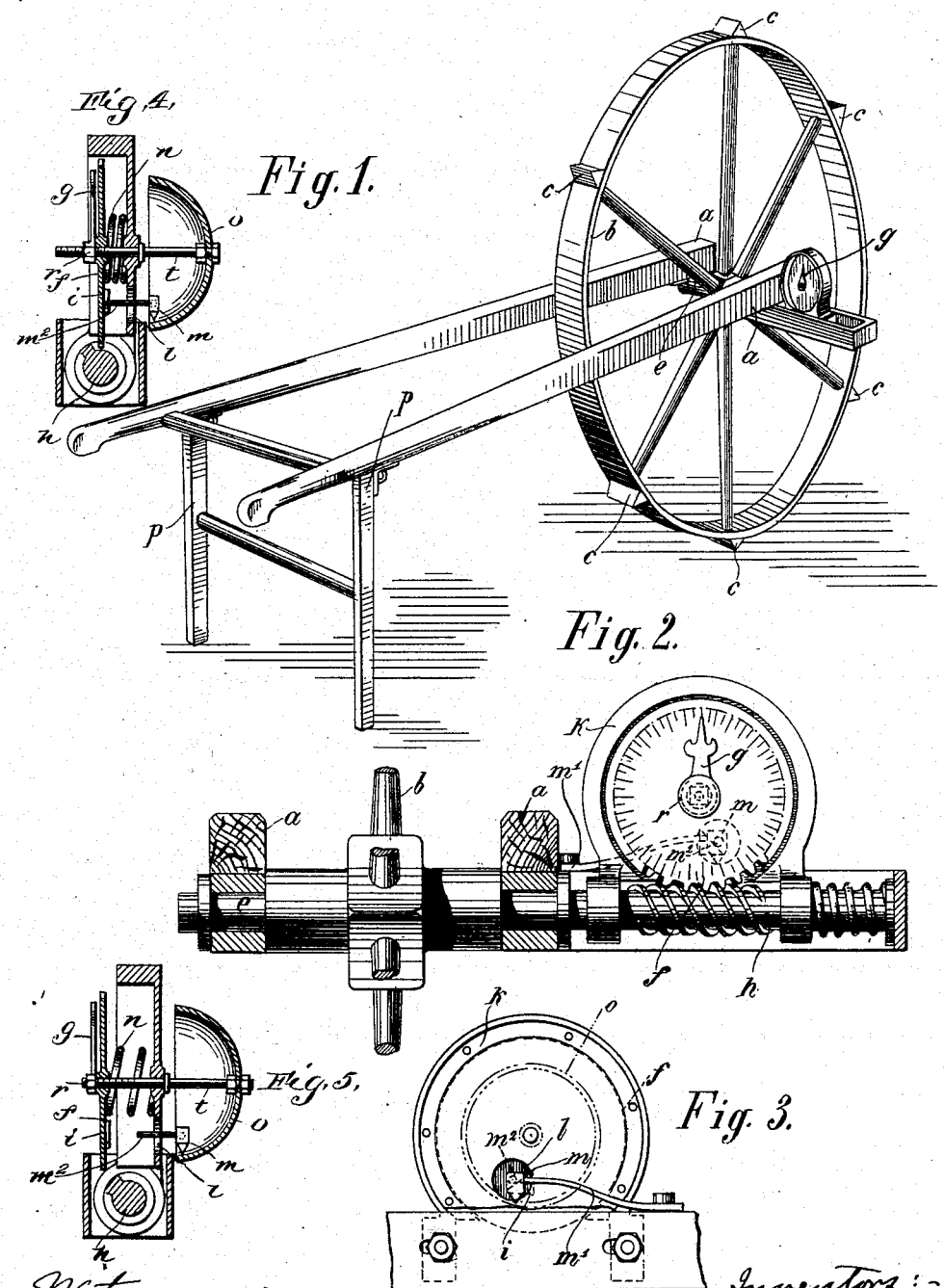

JOHANN STÁDEL, OF RAAB, AND EMERICH TORKOS, OF LICZKO, AUSTRIA-HUNGARY.

WHEELBARROW FOR MEASURING FIELDS, &c.

SPECIFICATION forming part of Letters Patent No. 673,300, dated April 30, 1901.

Application filed May 31, 1899. Serial No. 718,814. (No model.)

*To all whom it may concern:*

Be it known that we, JOHANN STÁDEL, residing at Raab, and EMERICH TORKOS, residing at Liczko, Austria-Hungary, subjects of the Emperor of Austria-Hungary, have invented certain new and useful Improvements in Wheelbarrows for Measuring Fields and the Like, (for which Letters Patent have been granted in Austria December 19, 1898; in Hungary December 6, 1898, and in Germany April 27, 1899,) of which the following is a full, clear, and exact description, such as will enable others skilled in the art to which it appertains to make and use the same.

The present invention relates to a wheelbarrow by means of which the size of a field or other surface can be quickly measured in a simple and reliable manner. With the assistance of this wheelbarrow anybody, although not acquainted with engineering, can make measurements, and by the use of this apparatus all auxiliary manual labor, which is absolutely necessary when measurements are made by means of the chain or other instrument, may be dispensed with.

The invention is represented upon the accompanying drawings, upon which—

Figure 1 is a perspective view of the barrow. Fig. 2 is a front view of the counting mechanism arranged on the barrow on an enlarged scale; Fig. 3, a back view of the same. Fig. 4 is a transverse vertical sectional view of the counter and alarm mechanism, the parts being in operative position. Fig. 5 is a similar view of the same in inoperative position, the dial being out of engagement with the screw-thread or worm.

The principal constituent part of this measuring-wheelbarrow is the wheel $b$, arranged between the driving rods or bars $a\,a$, the diameter of which wheel is such that its circumference represents a determined length—for example, one or two meters. This circumference is divided into fractional parts of the unit of length chosen—for example, into decimeters—and at each point of division a rib or projection $c$ is provided on the periphery of the wheel. It is preferable to arrange the spokes at these points of division. The axle $e$ of the wheel $b$ communicates at once with counting mechanism, by means of which the number of revolutions described by the wheel $b$ is indicated. This counting mechanism consists of a rotating dial $f$ and indicating-hand $g$. The dial $f$ is provided with teeth on its periphery, which engage with the screw-thread or worm $h$ on an extension of the axle $e$. The screw-thread or worm $h$ rotates with the wheel $b$, and consequently moves the dial $f$, which is arranged beneath the fixed indicating-hand $g$. Division-marks are provided on the dial $f$, and the latter is moved through the distance between two of the marks upon the wheel $b$ rotating once. The gear can, for example, be so chosen that one rotation of the dial $f$ corresponds with a hundred revolutions of the wheel $b$, in which case, of course, one hundred division-marks would be passed through on the dial. Upon the back of the dial $f$ a triangular lug or projecting piece $i$ is arranged in such a manner that it passes a circular opening $l$ in the back part of the casing $k$ upon every revolution of the dial, Fig. 3. A pin $m^2$ projects through the opening $l$, which pin is fitted to a hammer $m$, supported by a spring-arm $m'$. The point of the hammer $m$ rests upon the inner surface of the bell $o$, arranged on the back and outside of the casing of the dial. Now when the triangular projecting piece $i$ passes the opening $l$ the pin $m^2$ on the hammer $m$ slides upon the inclined surface of this triangular projecting piece to the point of the same and then falls suddenly, whereby the point of the hammer strikes upon the bell $o$ and by this means indicates when a revolution of the dial $f$ has taken place. The driving rods or bars $a\,a$ are provided at the back with folding legs $p$.

When it is desired to measure the breadth or length of a field, the barrow is wheeled over the distance in question. It is apparent that the number of revolutions of the wheel $b$ will give the length passed over in the units of length arranged for. The number of revolutions is ascertained partially by counting the number of signals given by the hammer $m$ and partially by examining the counting mechanism. Each signal of the hammer indicates that as many units of length have been passed over as there are divisions on the dial $f$. By adding the number of these units of length to the units of length passed over since the last signal, which can be read off from the dial, the total units of length passed over are obtained, whereas the fractional parts—for example, decimeters—are indicated by the indentations of the ribs $c$ upon the ground. From the length thus obtained the superficial contents of the ground to be measured can be calculated in the well-known manner. In order to facilitate the measurements, the dial $f$ should always be placed at "0" before starting. For this purpose the screw-nut $r$, which presses upon the dial $f$, is pushed forward under the action of the spiral spring $n$, arranged beneath it, so that the teeth on the periphery of the dial can be brought out of engagement with the screw-thread or worm $h$ and the dial can be turned by hand into the desired position.

Fig. 4 of the drawings represents the dial held in mesh with the worm, and Fig. 5 represents the dial released from the worm in readiness to be set in the desired starting position.

What we claim as our invention, and desire to secure by Letters Patent, is—

In a measuring device of the character described the combination of a wheel $b$, a worm $h$, a counting device comprising frame $k$, pin $t$, a dial provided with teeth on its periphery rotatably mounted upon said pin and in mesh with the worm $h$, a stationary indicating hand or pointer an expanding spring $n$ interposed between the dial and the frame adapted to throw the dial out of engagement with the worm, and a nut rotatably mounted upon the pin and adapted to hold the dial in operative position substantially as and for the purpose specified.

In testimony whereof we have hereunto set our hands in the presence of two witnesses.

JOHANN STÁDEL.
EMERICH TORKOS.

Witnesses:
 JOSEPH WIEKMAN,
 MOLMARODAY.